United States Patent [19]

Takagi

[11] Patent Number: 5,676,749
[45] Date of Patent: Oct. 14, 1997

[54] HIGHLY FLUIDIZED CONCRETE COMPOSITION

[75] Inventor: Yoshihiko Takagi, Takefu, Japan

[73] Assignees: Marutaka Concrete Industry Co., Ltd.; Takagi Corporation, both of Fukui-ken; Nissan Chemical Industries, Ltd., Tokyo, all of Japan

[21] Appl. No.: 653,686

[22] Filed: May 23, 1996

[30] Foreign Application Priority Data

May 26, 1995 [JP] Japan ................... 7-127642

[51] Int. Cl.$^6$ .......................... C04B 24/12; C04B 24/16
[52] U.S. Cl. .................. 106/725; 106/714; 106/808; 106/809; 106/823
[58] Field of Search ...................... 106/725, 808, 106/809, 823, 714

[56] References Cited

U.S. PATENT DOCUMENTS

| | | | |
|---|---|---|---|
| 3,997,502 | 12/1976 | Schaupp | 106/725 |
| 4,820,766 | 4/1989 | Lahalih et al. | 524/6 |
| 5,316,572 | 5/1994 | Okamura et al. | 106/714 |

FOREIGN PATENT DOCUMENTS

| | | | |
|---|---|---|---|
| 2486066 | 1/1982 | France | 106/725 |
| 2007603 | 2/1971 | Germany | 106/725 |
| 2049159 | 4/1972 | Germany | 106/725 |
| 3004543 | 8/1980 | Germany | 106/725 |
| 56-026758 | 3/1981 | Japan | 106/808 |
| 3-237049 | 3/1991 | Japan | |
| 5-58689 | 3/1993 | Japan | |

OTHER PUBLICATIONS

WPIDS Abstract No. 79–76079B, which is an abstract of Japanese Patent Specification No. 54–114531 (Sep. 1979).
WPIDS Abstract No. 80–65008C, which is an abstract of Japanese Patent Specification No. 55–100251 (Jul. 1980).
WPIDS Abstract No. 81–27271D, which is an abstract of Belgium Patent No. 886500 (Apr. 1981).
WPIDS Abstract No. 83–739223, which is an abstract of Soviet Union Patent No. 963969 (Feb. 1983).
WPIDS Abstract No. 84–229023, which is an abstract of Japanese Patent Specification No. 59–137351 (Aug. 1984).
WPIDS Abstract No. 86–281774, which is an abstract of Japanese Patent Specification No. 61–205683 (Sep. 1986).
WPIDS Abstract No. 89–223602, which is an abstract of Japanese Patent Specification No. 1–159207 (Jun. 1989).
WPIDS Abstract No. 91–137314, which is an abstract of Japanese Patent Specification No. 3–075254 (Mar. 1991).
WPIDS Abstract No. 93–121107, which is an abstract of Japanese Patent Specification No. 5–058689 (Mar. 1993).

*Primary Examiner*—Anthony Green
*Attorney, Agent, or Firm*—Rothwell, Figg, Ernst & Kurz

[57] ABSTRACT

A concrete composition contains, per 1 m$^3$ of the concrete composition, powders of normal portland cement, high-early strength Portland cement, and an inorganic material, in a total weight of from 400 to 600 kg; a formalin condensation product of melamine sulfonate in an amount of from 0.1 to 2.5 wt % based on the total weight of the powders; a hardening accelerator in an amount of from 0.01 to 1.50 wt % based on the total weight of the powders; and water, fine aggregate and coarse aggregate. The mixing ratio of the powers is so specified that the powder of high-early strength portland cement is in a range of from 20 to 500 parts by weight and the powder of an inorganic material is in a range of from 20 to 500 parts by weight on the basis of the powder of normal portland cement of 100 parts by weight. The water, fine aggregate and coarse aggregate are mixed in such a mixing ratio as to give a slump flow value ranging from 50 to 70 cm to the concrete composition. The concrete composition exhibits a high initial strength and enables preferable concrete placing or molding without compactness using a vibrator, tamper, wooden hammer or the like.

14 Claims, No Drawings

HIGHLY FLUIDIZED CONCRETE COMPOSITION

BACKGROUND OF THE INVENTION

The present invention relates to a concrete composition exhibiting a high initial strength, and particularly enabling preferable concrete placing or molding without the so-called compaction using a vibrator, tamper, wooden hammer or the like.

The compaction using a vibrator, tamper, wooden hammer or the like has been used for concrete placing in order that the placed concrete can be sufficiently bonded to reinforcing bars or buried members and uniformly tightened without generation of voids.

Some concrete compositions enabling preferable concrete placing without compaction, however, have been proposed. For example, Japanese Patent Laid-open No. Hei 3-237049 discloses a method of placing in air concrete added with a water-soluble polymer material such as a cellulose based or acrylic material and a high performance AE water reducing agent.

The compaction performed upon concrete placing generates noise too large to be transmitted up to a location very remote from the working area, tending to harm the environments.

The compaction using a vibrator also severely damages a frame filled with concrete, and the excessive compaction generates bleeding, separation between cement paste and aggregate in concrete, and sedimentation of coarse aggregate in concrete.

The concrete composition disclosed in the above document, Japanese Patent Laid-open No. Hei 3-237049 exhibits a high fluidity by the addition of the high performance water reducing agent and prevents separation between cement paste and aggregate in concrete and sedimentation of coarse aggregate in concrete by the addition of the cellulose based thickener.

The above concrete composition using the high performance water reducing agent in combination with the cellulose based thickener, however, is disadvantageous in retarding the setting of the concrete and reducing the initial strength of the concrete.

The placing of the above concrete composition at a low temperature, for example, in winter thus retards a term of works, and also the molding of the above concrete composition into a concrete product takes a longer time from molding to form-removal and thereby lowers usage of a frame.

SUMMARY OF THE INVENTION

An object of the present invention is to provide a concrete composition exhibiting not only a high fluidity and a high resistance against separation from aggregate but also a high initial strength Portland and particularly enabling preferable concrete placing or molding without compaction.

To achieve the above object, according to a preferred mode of the present invention, there is provided a concrete composition containing, per 1 $m^3$ of the concrete composition, powders of normal portland cement, high-early strength Portland cement, and an inorganic material, in a total weight of from 400 to 600 kg; a formalin condensation product of melamine sulfonate in an amount of from 0.1 to 2.5 wt % based on the total weight of the powders; a hardening accelerator in an amount of from 0.01 to 1.50 wt % based on the total weight of the powders; and water, fine aggregate and coarse aggregate. The mixing ratio of the powers is preferably so specified that the powder of high-early strength portland cement is in a range of from 20 to 500 parts by weight and the powder of an inorganic material is in a range of from 20 to 500 parts by weight on the basis of the powder of normal portland cement of 100 parts by weight. The water, fine aggregate and coarse aggregate are preferably mixed in such a mixing ratio as to give a slump flow value ranging from 50 to 70 cm to the concrete composition.

A preferable concrete composition exhibiting a high initial strength, which includes powders of normal portland cement, high-early strength cement and an inorganic material, can be obtained by increasing the ratio of the powder of high-early strength cement and decreasing the ratio of the powder of an inorganic material on the basis of the total weight of the powders.

The combination of the powder of high-early strength cement and a hardening accelerator added in an amount of from 0.01 to 1.5 wt %, preferably, from 0.02 to 1.30 wt % on the basis of the total weight of the powders exerts a synergistic effect on appearance of a high initial strength of the concrete composition. In this case, it is most preferable to use as the hardening accelerator, a mixture of calcium nitrite and calcium nitrate which is added in an amount of from 0.04 to 1.30 wt %.

The combination of a fine powder of calcium carbonate, as an inorganic material, having a specific surface area in a range of from 3000 to 6000 $cm^2/g$, preferably, from 3500 to 5000 $cm^2/g$; a formalin condensation product of melamine sulfonate in an amount of from 0.1 to 2.5 wt %, preferably, from 0.4 to 1.5 wt % on the basis of the total weight of the powders; and the powders in an amount of 400 kg or more per 1 $m^3$ of the concrete composition exerts a synergistic effect on prevention of separation between cement paste and aggregate in concrete and sedimentation of coarse aggregate in concrete, and on provision of a preferable slump flow value to the concrete composition.

From the viewpoint of fluidity, a concrete composition having a slump flow value less than 50 cm requires compaction upon placing the concrete composition because it cannot exhibit a sufficient self-filling performance.

On the contrary, a concrete composition having a slump value over 70 cm tends to generate separation between cement paste and aggregate, sedimentation of coarse aggregate, and bleeding because it cannot exhibit a sufficient resistance against separation.

On the other hand, the divided addition of a unit water in relation to charge of aggregate in a kneading method for a concrete composition is effective to suitably accelerate conformability between components of the concrete composition in accordance with the kneading state thereof, and to enhance the slump flow value, resistance against separation, and self-filling performance of the concrete composition.

The reason why such a kneading method increases and stabilizes the slump flow value, resistance against separation and self-filling performance without large variations is that it allows uniform mixing of the components of the concrete composition.

DETAILED DESCRIPTION OF THE PREFERRED EMBODIMENTS

Normal portland cement and high-early strength portland cement used for a concrete composition of the present invention may be those generally used in this field as specified in JIS R 5210.

Examples of powders of inorganic materials include a fine powder of blast furnace slag, fly ash, silica fume and a fine powder of calcium carbonate. In particular, the fine powder of calcium carbonate is preferable for the present invention. A preferable example of the fine powder of calcium carbonate has a specific surface area nearly in a range of from 3000 to 6000 cm$^2$/g, preferably, from 3500 to 5000 cm$^2$/g.

The mixing ratio of powders is so specified that the powder of high-early strength portland cement is in a range of from 20 to 500 parts by weight and the powder of an inorganic material is in a range of from 20 to 500 parts by weight on the basis of the powder of normal portland cement of 100 parts by weight.

The composition of the powders may be further added with other components without departing from the scope of the present invention; however, the mixing ratio of the powders is generally so specified that the powder of normal portland cement is in an amount of from 10 to 50 wt %, preferably, from 15 to 45 wt %; the powder of high-early strength Portland cement is in an amount of from 10 to 50 wt %, preferably, from 15 to 45 wt %; and the powder of inorganic material is in an amount of from 20 to 50 wt %, preferably, from 25 to 45 wt %.

A formalin condensation product of melamine sulfonate of a type generally used as an admixture of normal concrete is added to the above powders nearly in an amount of from 0.1 to 2.5 wt %, preferably, from 0.4 to 1.5 wt %.

A hardening accelerator of a type generally used for normal concrete is used with the above powders. Examples of the hardening accelerators include sulfates, thiocyanates, thiosulfates, carbonates, nitrates, nitrites of alkali metals such as sodium or alkali earth metals such as calcium; and mixtures thereof. It is particularly desirable to use calcium nitrite, calcium nitrate and a mixture of calcium nitrite and calcium nitrate.

The hardening accelerator is added to the powders of normal portland cement, high-early strength Portland cement and an inorganic material in an amount of nearly from 0.01 to 1.50 wt %, preferably, from 0.02 to 1.30 wt %.

It is particularly desirable to add a mixture of calcium nitrite and calcium nitrate to the above powders in an amount of from 0.04 to 1.30 wt %.

The concrete composition generally further contains water, fine aggregate and coarse aggregate; and it may, of course, contain other additives without departing from the scope of the present invention.

The concrete composition of the present invention contains, per 1 m$^3$ of the concrete composition, powders of normal portland cement, high-early strength Portland cement, and an inorganic material, in a total weight of from 400 to 600 kg; a formalin condensation product of melamine sulfonate in an amount of from 0.1 to 2.5 wt % based on the total weight of the powders; a hardening accelerator in an amount of from 0.01 to 1.50 wt % based on the total weight of the powders; and water, fine aggregate, coarse aggregate and other additives. The concrete composition is suitably kneaded before concrete placing.

The water, fine aggregate, coarse aggregate, and other additives are added directly after kneading of the concrete components in such amounts as to allow the concrete composition to exhibit a slump flow value in a range of from 50 to 70 cm.

Specifically, to provide the above slump flow value to the concrete composition, the water, fine aggregate and coarse aggregate are preferably added in such a manner that a water-powder ratio is in a range of from 0.25 to 0.5, preferably, from 0.30 to 0.40 and a fine aggregate percentage is in a range of from 40 to 55%, preferably, from 43 to 50%.

The concrete composition of the present invention can be kneaded using a known mixer. A preferable kneading method includes the steps of charging fine aggregate in a rotating mixer; charging coarse aggregate after an elapse of nearly from 2 to 6 seconds while adding water in an amount of 95 to 98% of a unit water amount after an elapse of nearly from 0.5 to 3.5 seconds; charging a powder of normal portland cement in an amount of 100 parts by weight, a powder of high-early strength Portland cement in an amount of from 20 to 500 parts by weight, and a powder of an inorganic material in an amount of from 20 to 500 parts by weight after an elapse of nearly from 5 to 10 seconds since start of kneading; adding the remaining water after an elapse of nearly from 50 to 70 seconds since start of kneading; and charging a formalin condensation product of melamine sulfonate and a hardening accelerator after an elapse of nearly from 0.5 to 4.5 seconds; and kneading the components for a time nearly from 100 to 180 seconds since start of kneading.

Another preferable kneading method includes the steps of: charging fine aggregate in a rotating mixer; charging a formalin condensation product of melamine sulfonate and a hardening accelerator while adding water in an amount of 75 to 95% of a unit water amount after an elapse of nearly from 0.5 to 4.5 seconds since start of agitating; charging a powder of normal portland cement in an amount of 100 parts by weight, a powder of high-early strength portland cement in an amount of from 20 to 500 parts by weight and a powder of an inorganic material in an amount of from 20 to 500 parts by weight after an elapse of nearly from 4 to 7 seconds since start of kneading; charging coarse aggregate after an elapse of 1 to 5 seconds; adding the remaining water after an elapse of nearly from 50 to 80 seconds since start of kneading; and kneading the components for a time nearly from 100 to 180 seconds since start of kneading.

The manufacture of the concrete composition using the above kneading method can increase and stabilize the slump flow value, resistance against separation, and self-filling performance without large variations because it allows uniform mixing of the components.

The present invention will be more clearly understood by way of the following test.

Materials used for the test are as follows: a powder C1 of commercial available normal portland cement having a specific gravity of 3.16; a powder C2 of commercial available high-early strength Portland cement having a specific gravity of 3.10; a fine powder C3 of commercial available calcium carbonate having a specific gravity of 2.7 and a specific surface area of 3700 m$^2$/g; fine aggregate (pit sand) having a specific gravity of 2.6, a fineness modulus (F. M.) of 2.6 and a percentage of water absorption of 2.1%; coarse aggregate A1 (manufactured sand) having a specific gravity of 2.7, a fineness modulus (F. M.) of 6.1 and a percentage of water absorption of 0.78%; coarse aggregate A2 (manufactured sand) having a specific gravity of 2.7, a fineness modulus (F. M.) of 7.0 and a percentage of water absorption of 0.74%; a solution SMF containing a formalin condensation product of melamine sulfonate in an amount of 42 wt % (produced by Nissan Chemical Industries Ltd. in the trade name of "Accelete TS-300") and a hardening accelerator solution CAN1 mainly containing calcium nitrite and calcium nitrate dissolved in an amount of 45 wt % (produced by Nissan Chemical Industries Ltd. in the trade name of "Accelete TS-600").

The materials were adjusted in accordance with each composition (unit: kg/m$^3$) described in Table 1. A forced mixing type biaxial mixer was rotated and the fine aggregate, water, C1, C2, A1, A2, SMF and CAN1 were collectively charged in the mixer, followed by agitation for 120 seconds since start of kneading, to prepare Inventive Composition Nos. 1 to 4 and Comparative Composition Nos. 5 and 6.

TABLE 1

| compo-sition No. | unit amount | | | | | | | | |
|---|---|---|---|---|---|---|---|---|---|
| | C1 | C2 | C3 | water | fine aggregate | coarse aggregate A1 | coarse aggregate A2 | SMF | CAN1 |
| 1 | 110 | 248 | 193 | 195 | 696 | 882 | 0 | 13.8 | 4.6 |
| 2 | 248 | 110 | 193 | 195 | 696 | 882 | 0 | 13.8 | 4.6 |
| 3 | 104 | 234 | 182 | 195 | 752 | 352 | 529 | 13.0 | 4.3 |
| 4 | 234 | 104 | 182 | 195 | 752 | 352 | 529 | 13.0 | 4.3 |
| 5 | 248 | 110 | 193 | 195 | 696 | 882 | 0 | 0 | 4.6 |
| 6 | 248 | 110 | 193 | 195 | 696 | 882 | 0 | 13.8 | 0 |

Composition Nos. 1 to 6 were then measured by the following methods in terms of (a) slump flow value, (b) resistance against separation, (c) self-filling performance, and (d) compressive strength of hardened concrete.

(a) Slump Flow Value

The slump test specified in JIS A 1101 was performed. In this test, diameters of an extended concrete composition in the longest direction and the direction perpendicular to the longest direction were measured, and the half of the sum of both the diameters was taken as a slump flow value (mm).

(b) Resistance against Separation

The separation between cement paste and aggregate, sedimentation of coarse aggregate, and bleeding in a concrete composition were visually observed by five experienced persons engaged in manufacture of concrete compositions for a period of time more than five years. A concrete composition judged by the experienced persons not to generate neither of the separation between cement paste and aggregate, sedimentation of coarse aggregate, and bleeding was indicated by the mark ○, and a concrete composition judged by the experienced persons to generate one or more of the above imperfections was indicated by the mark ×.

(c) Self-filling Performance

A concrete composition was molded in a acrylic resin made transparent form having a size of [25 cm×4 cm]×100 cm (height), and was visually observed by five experienced persons engaged in manufacture of concrete compositions for a period of time more than five years. A concrete composition judged by the experienced persons to perfectly fill the entire form without compaction was indicated by the mark ○, and a concrete composition judged by the experienced persons not to perfectly fill the entire form without compaction was indicated by the mark ×.

(d) Compressive Strength of Hardened Concrete

A concrete composition was molded into a form having a diameter of 10 cm and a height of 20 cm, and then hardened by curing at 5° C. for 24 hours or by leaving at 5° C. for six hours, followed by steam curing at 60° C. for three hours. The hardened concrete was measured in terms of compressive strength in accordance with the specification of JIS A 1108.

The measured results are shown in Table 2.

TABLE 2

| compo-sition No. | resistance | | | compressive strength (kg/cm$^2$) | |
|---|---|---|---|---|---|
| | slump flow value (mm) | against separation | self-filling performance | 5° C. curing | steam curing |
| 1 | 570 | ○ | ○ | 47 | — |
| 2 | 580 | ○ | ○ | — | 120 |
| 3 | 540 | ○ | ○ | 41 | — |
| 4 | 550 | ○ | ○ | — | 105 |
| 5 | 300 | ○ | × | 30 | 119 |
| 6 | 580 | ○ | ○ | 20 | 50 |

The results of Table 2 shows that the concrete composition of the present invention placed or molded is preferable in slump flow value, resistance against separation, and self-filling performance, and thereby it eliminates compaction using a vibrator, tamper, wooden hammer or the like.

On the contrary, Comparative Composition No. 5 in which the formalin condensation product of melamine sulfonate is not added, is not preferable in self-filling performance and thereby it requires compaction using a vibrator, tamper, wooden hammer or the like for concrete placing or molding; and Comparative Composition No. 6 in which the hardening accelerator is not added, is not preferable in appearance of initial strength.

Next, a difference in kneading of the concrete composition (Inventive Composition No. 3) exerting an effect on the slump flow value, resistance against separation, and self-filling performance will be estimated.

A kneading method A for the concrete composition includes the steps of collectively charging the fine aggregate, water, C1, C2, C3, A1, A2, SMP and CAN1 in a rotating forced mixing type biaxial mixer; and agitating the components for 120 seconds after start of kneading.

Another kneading method B for the concrete composition includes the steps of: charging the fine aggregate in a rotating biaxial mixer; charging coarse aggregate water after an elapse of about four seconds while adding water in an amount of 97% of a unit water amount after an elapse of about one second; charging the powder of normal portland cement in an amount of 100 parts by weight, the powder of high-early strength portland cement in an amount of from 20 to 500 parts by weight and the powder of the inorganic material in an amount of from 20 to 500 parts by weight after an elapse of 7 seconds since start of kneading; adding the remaining water after an elapse of about 60 seconds since start of kneading; adding the formalin condensation product of melamine sulfonate and the hardening accelerator after an elapse of about one second; and kneading the components for 120 seconds since start of kneading.

A further kneading method C for the concrete composition includes the steps of: charging fine aggregate in a rotating mixer; adding a formalin condensation product of melamine sulfonate and a hardening accelerator while adding water in an amount of 85% of a unit water amount after an elapse of about one second; charging the powder of normal portland cement in an amount of 100 parts by weight, the powder of high-early strength portland cement in an amount of from 20 to 500 parts by weight and the powder of the inorganic material in an amount of from 20 to 500 parts by weight after an elapse of about 5 seconds since start of kneading; charging the coarse aggregate after an elapse of about 3 seconds; adding the remaining water after an elapse of about 65 seconds since start of kneading; and kneading the components for 120 seconds since start of kneading.

The measured results are shown in Table 3.

TABLE 3

| kneading method | slump flow value (mm) | resistance against separation | self-filling performance |
|---|---|---|---|
| A | 500 | ◯ | ◯ |
| B | 540 | ◉ | ◉ |
| C | 540 | ◉ | ◉ |

The results of Table 3 shows that the concrete composition prepared by the kneading method B or C increases and stabilizes the slump flow value, resistance against separation, and self-filling performance, because it allows uniform mixing of the components of the concrete composition.

As described above, the concrete composition of the present invention exhibits a high initial strength and enables preferable concrete placing or molding without compacting using a vibrator, tamper, wooden hammer or the like.

Accordingly, the concrete placing or molding without compaction using the concrete composition of the present invention does not present a disadvantage upon compaction, for example, damage of a frame.

The early appearance of the strength of the concrete composition can increase the usage of a frame even for the execution in a low temperature season, for example, in winter, and thereby it can enhance working efficiency and productivity of molded products.

The concrete composition of the present invention does not generate bleeding, separation between cement paste and aggregate in concrete, and sedimentation of coarse aggregate in concrete, and thereby it can produce a uniform hardened concrete.

The concrete composition of the present invention can be subjected to steam curing, electric curing, and pressure curing, other than normal curing.

In addition, the concrete composition of the present invention can be adjusted by a normal method, for example, using a known ready mixed concrete plant, a mixer in a secondary product molding factory or a mixer in a job field, and particularly it is useful for molding into a box culvert, concrete retaining wall, concrete product for sewage, and the like.

While the present invention has been described by way of the examples, such description is for illustrative purposes only, and it is to be understood that many changes and modifications are possible without departing from the scope and spirit of the following claims.

What is claimed is:

1. A concrete composition comprising, per 1 $m^3$ of said concrete composition, powders of normal portland cement, high-early strength portland cement, and an inorganic material, in a total weight of from 400 to 600 kg wherein said powder of normal portland cement is 100 parts by weight, said powder of high-early strength portland cement is in a range of from 20 to 500 parts by weight and said powder of an inorganic material is in a range of from 20 to 500 parts by weight;

a formalin condensation product of melamine sulfonate in an amount of from 0.1 to 2.5 wt % based on the total weight of said powders;

a hardening accelerator in an amount of from 0.01 to 1.50 wt % based on the total weight of said powders; and water, fine aggregate and coarse aggregate.

2. A concrete composition according to claim 1, wherein said powder of an inorganic material is selected from a fine powder of blast furnace slag, fly ash, silica fume or a fine powder of calcium carbonate.

3. A concrete composition according to claim 2, wherein said fine powder of calcium carbonate has a specific surface area in a range of from 3000 to 6000 $cm^2/g$. fume or a fine powder of calcium carbonate.

4. A concrete composition according to claim 1, wherein said formalin condensation product of melamine sulfonate is added in an amount of from 0.4 to 1.5 wt % based on the total weight of said powders.

5. A concrete composition according to claim 1, wherein said hardening accelerator is added in an amount of 0.02 to 1.30 wt % based on the total weight of said powders.

6. A concrete composition according to claim 1, wherein said hardening accelerator is selected from alkali metal and alkaline earth metal sulfates, thiocyanates, thiosulfates, carbonates, nitrates or nitrites.

7. A concrete composition according to claim 6, wherein said hardening accelerator is a mixture of calcium nitrite and calcium nitrate in an amount of from 0.04 to 1.30 wt % based on the total weight of said powders.

8. A concrete composition according to claim 1, wherein said concrete composition comprises a mixing ratio of said water, said fine aggregates and said coarse aggregate such that said concrete composition possesses a slump flow value ranging from 50 to 70 cm.

9. A concrete composition according to claim 8, wherein the mixing ratio of said water, said fine aggregate and said coarse aggregate is so specified that a water-powder ratio is in a range of from 0.25 to 0.50 and a fineness aggregate percentage is in a range of from 40 to 55%.

10. A concrete composition according to claim 3, wherein said fine powder of calcium carbonate has a specific surface area in a range of from 3500 to 5000 $cm^2/g$.

11. A concrete composition according to claim 9, wherein the mixing ratio of said water, said fine aggregate and said coarse aggregate is so specified that a water-powder ratio is in a range of from 0.30 to 0.40 and a fineness aggregate percentage is in a range of from 43 to 50%.

12. A concrete composition according to claim 1, wherein said hardening accelerator is a mixture of two or more alkali metal or alkali earth metal sulfates, thiocyanates, thiosulfates, carbonates, nitrates and nitrites.

13. A method of kneading a concrete composition, comprising the steps of:

charging a fine aggregate in a rotating mixer;

charging a coarse aggregate and water in the rotating mixer;

charging powders of normal portland cement, high-early strength portland cement and an inorganic material in the rotating mixer, wherein said powder of normal portland cement is 100 parts by weight, said powder of high-early strength portland cement is in a range of from 20 to 500 parts by weight and said powder of an inorganic material is in a range of from 20 to 500 parts by weight;

charging a formalin condensation product of melamine sulfonate in an amount of from 0.1 to 2.5 wt % based on the total weight of said powders;

charging a hardening accelerator in an amount of from 0.01 to 1.50 wt % based on the total weight of said powders; and kneading said concrete composition in the rotating mixer.

14. A method of kneading a concrete composition, comprising the steps of:

charging a fine aggregate in a rotating mixer;

charging powders of normal portland cement, high-early strength portland cement and an inorganic material, wherein said powder of normal portland cement is 100 parts by weight, said powder of high-early strength portland cement is in a range of from 20 to 500 parts by weight and said powder of an inorganic material is in a range of from 20 to 500 parts by weight;

charging a formalin condensation product of melamine sulfonate in an amount of from 0.1 to 2.5 wt % based on the total weight of said powders;

charging water and a hardening accelerator in an amount of from 0.01 to 1.50 wt % based on the total weight of said powders;

charging a coarse aggregate and additional water; and kneading said concrete composition in the rotating mixer.

\* \* \* \* \*